United States Patent [19]
Kohn et al.

[11] Patent Number: 6,162,380
[45] Date of Patent: Dec. 19, 2000

[54] METHOD FOR PRODUCING FOAMED PLASTIC HOLLOW BODIES

[75] Inventors: Udo Kohn, Darmstadt; Franz Steigerwald, Griesheim, both of Germany

[73] Assignee: Wella Aktiengesellschaft, Darmstadt, Germany

[21] Appl. No.: 09/297,712

[22] PCT Filed: Sep. 8, 1998

[86] PCT No.: PCT/EP98/05692

§ 371 Date: May 6, 1999

§ 102(e) Date: May 6, 1999

[87] PCT Pub. No.: WO99/12724

PCT Pub. Date: Mar. 18, 1999

[30] Foreign Application Priority Data

Sep. 10, 1997 [DE] Germany .......................... 197 39 627

[51] Int. Cl.[7] .......................... B29C 49/04; B29C 44/02
[52] U.S. Cl. .......................... 264/45.9; 264/54; 264/540
[58] Field of Search .............. 264/54, 540, 45.9

[56] References Cited

U.S. PATENT DOCUMENTS

| | | | |
|---|---|---|---|
| 3,225,127 | 12/1965 | Scott, Jr. | 264/540 |
| 3,502,753 | 3/1970 | Rhoads | 264/540 |
| 4,546,899 | 10/1985 | Williams | 264/46.6 |
| 4,668,567 | 5/1987 | Williams | 264/54 |
| 4,874,649 | 10/1989 | Daubenbuchel et al. | 264/46.4 |
| 5,328,651 | 7/1994 | Gallagher et al. | 264/45.9 |
| 5,819,991 | 10/1998 | Kohn et al. | 222/215 |

FOREIGN PATENT DOCUMENTS 223 17 03 U  1/1973  Germany .......................... 264/540

*Primary Examiner*—Allan R. Kuhns
*Attorney, Agent, or Firm*—Michael J. Striker

[57] ABSTRACT

In the method of producing a hollow foamed plastic body from polyethylene or polypropylene by means of an extrusion blow-molding process using a single-screw extruder and a blow-molding tool, the plastic material is foamed by means of a chemical blowing agent, and a pre-molded tube blank formed from the foamed plastic material is blow-molded in the blow-molding tool. The blow-molding tool has a tool surface temperature of at least 35° C. over at least one portion of the surface. A blowing agent that decomposes endothermically and provides a nucleation effect is included in a blowing-agent master batch based on high density polyethylene. The master batch has an average grain size of about 1 mm and the pre-molded tube blank is blow molded at a pressure of from 0.5 to 2.0 bar, or the pre-molded tube blank is blow-molded in an interval blow-molding process with a blow-molding pressure of from 3 to 10 bar, preferably 8 to 10 bar, in a first time slot and a blow-molding pressure of from 0.5 to 1.0 bar in a second time slot.

35 Claims, No Drawings

METHOD FOR PRODUCING FOAMED PLASTIC HOLLOW BODIES

BACKGROUND OF THE INVENTION

Field of the Invention

The present invention relates to a method of producing a hollow foamed plastic body made of polyethylene or polypropylene in an extrusion, blow-molding process with a single-screw extruder and with a blow-molding tool, in which the plastic material is foamed by means of a chemical blowing agent and a pre-molded tube blank formed from the foamed plastic material is blow-molded in the blow-molding tool.

In the course of attempts to reduce material outlay for hollow plastic bodies, in particular in packaging, it is known to produce packaging containers (bottles) from foamed plastic material. Packaging containers of this type are frequently used in areas of application in which a smooth exterior surface is an essential functional feature, so as to present an attractive appearance of the product. However, the foamed hollow bodies produced in extrusion blow-molding have an irregular bulging of the exterior surface caused by gas bubbles in the foam. The distribution of the gas bubbles in the wall of the foamed hollow bodies is also frequently not sufficiently homogeneous, which results in irregular gas cavities and which affects in turn the exterior surface as well as the mechanical properties of the wall. These effects are particularly serious where the wall thicknesses of the hollow bodies are in the range of less than 1.5 mm. In order to avoid this drawback in the case of extrusion blow-molded foamed hollow bodies, a compact, smooth outer skin for example is extruded on in the coextrusion process. Other methods, such as for example in accordance with DE 1504359-A, suggest producing a compact outer skin by rapid cooling of the extruded tube on the outside thereof before the blow-molding process. In this case, an attempt is made at the same time to regulate an uncontrolled foam expansion on the tube.

In a further publication PCT/EP96/05485 it is proposed to produce a smooth outer skin by encasing a container with a smooth container decoration.

All the steps and methods described have the drawback that special applications have to be performed with respect to the smooth outer skin, which increase costs in such a way that a substantial proportion of the cost advantage is offset by the foamed hollow body.

In a further publication DE 19525198-A a method is described which is intended to allow an extrusion blow-molded foamed hollow body to be produced whilst maintaining specific parameters. For this purpose, a foaming agent is admixed with a commercially available PE granulate. This usually takes place as a batch granulate on the basis of PE with a grain size of from 3 to 5 mm or as a powder which is admixed with the PE granulate. In addition, the plastics-material melt is heated to from 20 to 30° above the melting temperature of the compact plastics material and a pressure of the blowing air of from 0.5 to 2.5 bar is applied. In this case, the blow-molding tool is cooled to a temperature of from 7 to 15° C. When setting these parameters, which only represent the prior art, although a foamed hollow body can be produced, it does not meet the requirements with respect to the desired properties, in particular the smooth outer surface and the fine distribution of the gas bubbles in the plastics-material matrix.

SUMMARY OF THE INVENTION

The object of the invention is to provide a method of making a hollow foamed plastic body of the above-described kind from polyethylene or polypropylene by an extrusion blow-molding process with a single-screw extruder and a blow-molding tool respectively by which a smooth exterior surface and a fine distribution of the gas bubbles is achieved by method steps which require practically no costly additional outlay.

This object, and others which will be made more apparent hereinafter, is attained in a method of producing a hollow foamed plastic body made of polyethylene or polypropylene in an extrusion, blow-molding process with a single-screw extruder and with a blow-molding tool, in which the plastic material is foamed by means of a chemical blowing agent and a pre-molded tube blank formed from the foamed plastic material is blow-molded in the blow-molding tool.

According to the invention the method comprises the steps of:

a) providing a blowing-agent master batch that disintegrates endothermically and provides a nucleation effect during the blow-molding process and has an average grain size of about 1 mm;

b) making a mixture comprising a polyethylene granulate and a portion of the blowing-agent master batch, said polyethylene granulate comprising high density polyethylene;

c) extruding the mixture formed in step b) with a single-screw extruder to form a pre-molded tube blank; and d) blow molding the pre-formed tube blank at a blow-molding pressure of between 0.5 and 2.0 bar with a blow-molding tool having at least one portion of a tool surface at a tool surface temperature of at least 35° C. to form the hollow foamed plastic body; OR blow molding the pre-formed tube blank in an interval blow-molding process in a first time slot and in a subsequent second time slot, wherein a blow-molding pressure is between 3 and 10 bar in the first time slot and from 0.5 to 1.0 bar in the second time slot and with a blow-molding tool having at least one portion of a tool surface at a tool surface temperature of at least 35° C.; whereby the hollow foamed plastic body is formed.

When the method features according to the invention are applied, foamed hollow bodies with the properties described above and with a practically smooth exterior surface are surprisingly formed. In this case, no additional steps or additional devices are required. If one of the characterizing features is substantially changed, an immediate deterioration of the surface occurs, in that it has fine bulges for example or satisfactory density reduction or foam density is not achieved in the area described or the size and distribution of the foam bubbles is irregular.

DETAILED DESCRIPTION OF THE PREFERRED EMBODIMENTS

For a smooth exterior surface it is particularly important that the blow-molding pressure should be set specifically in the range of between 0.5 and 2.0 bar as a function of the shape of the hollow bodies and the wall thickness, in which case shapes with relatively large depressions and sharp corners/edges require the pre-molded tube blank to be blown out more vigorously with a blow-molding pressure in the higher pressure range of up to 2.0 bar.

Hollow bodies or bottle outlines which have to be molded in a special manner (acute corners and edges) can no longer be produced with a blow-molding pressure of up to 2 bar, but only by means of a so-called interval blow-molding process, a blow-molding pressure of from 3 to 10 bar (depending upon the wall thickness) being provided in a first time slot (preferably from 0.5 to 2.0 seconds) and a blow-molding pressure of from 0.5 to 1.0 being provided in a second time slot (preferably from 3 to 5 seconds).

In this way, for a smooth exterior surface it has been found to be particularly advantageous to provide a tool-surface temperature of from 35 to 40° C., preferably 35° C., as a result of which the gas-pressure pattern is advantageously affected during the formation of gas bubbles from the blowing agent.

In a further development the tempering of the surface of the blow-molding tool involves only part of the hollow body (bottle) which is in the area of vision of the user (covering area and shoulder area) whereas the base area—in which the greater quantity of heat has to be dissipated and thus determines the cycle time—has a customary tool temperature for the conventional cooling of from 7 to 15° C. For this purpose, the tool is divided into at least one cooling zone and one tempering zone. Since the blow-molding tool is divided into at least one cooling zone and one tempering zone, on account of the cooling zone a rapid cooling of the container part is possible in this region, this zone being provided for the base area and also optionally for the neck area in the case of bottles. As a result, although such an optimum smooth exterior surface is not then achieved—which is also unimportant in these areas—the cycle times customary in the case of a customary extrusion blow-molding process are nevertheless achieved in this way.

A multiple-component mixture of citric acid and salts of citric acid and carbonic acid has been found to be advantageous as a blowing agent for forming foam with a smooth surface. The blowing agent reacts endothermically during the disintegration. In addition, carbon dioxide, which has a nucleation effect, is produced during the disintegration reaction. The two features promote the formation of small fine gas bubbles.

A highly uniform mixing of the PE HD granulate with a grain size of from 3 to 5 mm is achieved with a blowing-agent master batch on the basis of HD PE with an average grain size of about 1 mm, and this decisively affects the formation of a smooth exterior surface and a fine distribution of the gas bubbles.

An optimum mixing ratio occurs when the granulate is provided with from 0.5 to 2.5% of the blowing-agent master batch.

This mixing is further assisted by the fact that in the inlet of the extruder the plastics material is heated starting with a temperature below the disintegration temperature of the blowing agent with a progressive temperature pattern towards the nozzle outlet.

In addition, the mixing is additionally optimized by a rotational speed of the extruder of from 20 to 25 r.p.m.

The production of bottle-like plastics-material bodies (bottles and tubes) by this method is particularly advantageous, since there is a considerable demand for them on the market.

For metering from a bottle-like plastics material it is advantageous to make the container squeezable in a resilient manner, which is achieved in that the foamed plastics material has a 10 to 30% lower density (foam proportion) than the density of the same non-foamed plastics material.

An addition of from 5 to 20% of LD PE—preferably about 5%—with respect to the base material HD PE causes a more intensive formation and a more uniform distribution of the gas bubbles.

For a metered discharge by squeezing against a wall of a bottle (upside-down), for example a shampoo bottle as a plastics hollow body, a maximum volume of 2.0 liters and a wall thickness of from 0.6 to 1.2 mm is provided.

EXAMPLES

A first example is described hereinafter:

A hollow body with a volume of 250 ml is produced in the extrusion blow-molding process. For this purpose, a PE HD granulate with a grain size of from 3 to 5 mm is mixed with 1.5% of the blowing-agent master batch described and is melted with a suitable extruder on an extrusion blow-molding machine and is extruded as a tube. To this end, a temperature program is selected which, starting at 170° C. in the inlet, ends with an increase to 210° C. at the nozzle outlet. A mass temperature of from 205 to 215° C. is required. The rotational speeds of the extruder have to be determined in accordance with the diameter and length of the extruder. Rotational speeds of from 20 to 25 r.p.m. are advantageous. The pre-molded tube blank is gripped by the tool mold and is pressed against the tool cavity at a blow-molding pressure of from 0.5 to 2.0 bar. The tool is cooled by water which is tempered to 35° C. The production process of the hollow body or bottle takes place with a cycle time of about 10 s, after which the foamed bottle described is removed from the tool. The bottle has a charging weight of 15 g and an average material density of 0.78 g/cm$^3$. The exterior surface is practically smooth and is considered to be cosmetic by the user. The cycle time of the production process practically does not differ from those of a production of compact hollow bodies (bottles) in particular even when using tempering/cooling divided with respect to the tool.

Second example:

A hollow body to be molded in a special manner (for example a rectangular bottle with acute corners and edges) with a volume of 250 ml is produced in the extrusion interval blow-molding process. For this purpose, a PE HD granulate with a grain size of from 3 to 5 mm is mixed with 1.5% of the blowing-agent master batch described and is melted on an extrusion blow-molding machine with a suitable extruder and is extruded as a tube. For this purpose a temperature program is selected which, starting at 170° C. in the inlet, ends with an increase to 210° C. at the nozzle outlet. A mass temperature of from 205 to 215° C. is required. The rotational speeds of the extruder have to be determined in accordance with the diameter and length of the extruder. Rotational speeds of from 20 to 25 r.p.m. are advantageous. The pre-molded tube blank is gripped by the tool mold and is blow-molded in a so-called interval blow-molding process, a blow-molding pressure of from 3 to 10 bar—preferably from 8 to 10 bar—being provided in a first time slot and a blow-molding pressure of from 0.5 to 1.0 bar being provided in a second time slot. A time of from 0.5 to 2.0 seconds is provided as the first time slot and a time of from 3 to 5 seconds is provided as the second time slot. The tool is cooled by water which is tempered to 35° C. The production process of the hollow body or bottle takes place with a cycle time of about 7 s, after which the foamed bottle described is removed from the tool. The bottle has a charging weight of 15 g and an average material density of 0.78 g/cm$^3$. The exterior surface is practically smooth and is considered to be cosmetic by the user. The cycle time of the production process practically does not differ from those of a production of compact hollow bodies (bottles) in particular even when using tempering/cooling divided with respect to the tool.

What is claimed is:

1. A method of making a hollow foamed plastic body from polyethylene in an extrusion blow-molding process, said method comprising the steps of:
   a) providing a blowing-agent master batch that disintegrates endothermically and provides a nucleation effect during the blow-molding process, said blowing-agent master batch having an average grain size of about 1 mm;
   b) making a mixture comprising a polyethylene granulate and a portion of the blowing-agent master batch, said polyethylene granulate comprising high density polyethylene;
   c) extruding the mixture formed in step b) with a single-screw extruder to form a pre-molded tube blank; and
   d) blow molding the pre-formed tube blank at a blow-molding pressure of between 0.5 and 2.0 bar with a blow-molding tool having at least one portion of a tool surface at a tool surface temperature of at least 35° C. to form the hollow foamed plastic body.

2. The method as defined in claim 1, wherein the blow-molding agent master batch comprises a blowing agent and said high density polyethylene.

3. The method as defined in claim 2, wherein the blowing agent comprises a mixture of citric acid, carbonic acid and salts of citric acid.

4. The method as defined in claim 1, wherein the tool surface temperature is from said 35° C. to 40° C. over said at least one portion of the tool surface.

5. The method as defined in claim 1, wherein said blow molding tool has at least one cooling zone and at least one tempering zone.

6. The method as defined in claim 5, wherein said at least one portion of said tool surface corresponds to a covering area of the hollow foam plastic body.

7. The method as defined in claim 5, wherein said at least one portion of said tool surface corresponds to a covering area and a shoulder area when said hollow foamed plastic body is a bottle.

8. The method as defined in claim 5, further comprising cooling the blow-molding tool to a temperature of from 7 to 15° C. in said at least one cooling zone and said at least one cooling zone corresponds to a container base of the hollow foamed plastic body.

9. The method as defined in claim 1, wherein said polyethylene granulate has a grain size of from 3 to 5 mm.

10. The method as defined in claim 1, wherein said portion of said blowing-agent master batch consists of from 0.5 to 2.5% by weight of said mixture.

11. The method as defined in claim 1, wherein said polyethylene granulate comprises from 5 to 20% by weight of low density polyethylene.

12. The method as defined in claim 1, wherein said polyethylene granulate comprises 5% by weight of low density polyethylene.

13. The method as defined in claim 1, wherein said single-screw extruder is operated at a rotational speed of from 20 to 25 rpm.

14. The method as defined in claim 1, wherein said single-screw extruder has an extruder inlet at a temperature below a disintegration temperature of the blowing agent and a progressive temperature pattern towards an extruder outlet of the single-screw extruder.

15. The method as defined in claim 1, wherein said hollow foamed plastic body has a density of from 10 to 30% lower than a density of non-foam plastic material having a composition that is the same as that of said hollow foamed plastic body.

16. The method as defined in claim 1, wherein said hollow foamed plastic body is a bottle and said bottle has a volume of up to 2.0 liters and a wall thickness of from 0.6 to 1.2 mm.

17. The method as defined in claim 1, wherein said blow-molding pressure is between 1.5 and 2.0 bar.

18. A method of making a hollow foamed plastic body from polyethylene in an extrusion blow-molding process, said method comprising the steps of:
   a) providing a blowing-agent master batch that disintegrates endothermically and provides a nucleation effect during the blow-molding process, said blowing-agent master batch having an average grain size of about 1 mm;
   b) making a mixture comprising a polyethylene granulate and a portion of the blowing-agent master batch, said polyethylene granulate comprising high density polyethylene;
   c) extruding the mixture formed in step b) with a single-screw extruder to form a pre-molded tube blank; and
   d) blow molding the pre-formed tube blank in an interval blow-molding process in a first time slot and in a subsequent second time slot, wherein a blow-molding pressure during the blow-molding process is between 3 and 10 bar in the first time slot and from 0.5 to 1.0 bar in the second time slot and with a blow-molding tool having at least one portion of a tool surface at a tool surface temperature of at least 35° C.; whereby the hollow foamed plastic body is formed.

19. The method as defined in claim 18, wherein said blow-molding pressure in said first time slot is from 8 to 10 bar.

20. The method as defined in claim 18, wherein the blowing-agent master batch comprises a blowing agent and said high density polyethylene.

21. The method as defined in claim 18, wherein the blowing agent comprises a mixture of citric acid, carbonic acid and salts of citric acid.

22. The method as defined in claim 18, wherein the tool surface temperature is from said 35° C. to 40° C. over said at least one portion of the tool surface.

23. The method as defined in claim 18, wherein said blow molding tool has at least one cooling zone and at least one tempering zone.

24. The method as defined in claim 23, wherein said at least one portion of said tool surface corresponds to a covering area of the hollow foamed plastic body.

25. The method as defined in claim 23, wherein said at least one portion of said tool surface corresponds to a covering area and a shoulder area of the hollow foamed plastic body when said hollow foamed plastic body is a bottle.

26. The method as defined in claim 23, further comprising cooling the blow-molding tool to a temperature of from 7 to 15° C. in said at least one cooling zone and said at least one cooling zone corresponds to a container base of the hollow foamed plastic body.

27. The method as defined in claim 18, wherein said polyethylene granulate has a grain size of from 3 to 5 mm.

28. The method as defined in claim 18, wherein said portion of said blowing-agent master batch consists of from 0.5 to 2.5% by weight of said mixture.

29. The method as defined in claim 18, wherein said polyethylene granulate comprises from 5 to 20% by weight of low density polyethylene.

30. The method as defined in claim 18, wherein said polyethylene granulate comprises 5% by weight of low density polyethylene.

31. The method as defined in claim 18, wherein said single-screw extruder is operated at a rotational speed of from 20 to 25 rpm.

32. The method as defined in claim 18, wherein said single-screw extruder has an extruder inlet at a temperature below a disintegration temperature of the blowing agent and a progressive temperature pattern towards an extruder outlet of the single-screw extruder.

33. The method as defined in claim 18, wherein said hollow foamed plastic body has a density of from 10 to 30% lower than a density of non-foam plastic material having a composition that is the same as that of said hollow foamed plastic body.

34. The method as defined in claim 18, wherein said hollow foamed plastic body is a bottle and said bottle has a volume of up to 2.0 liters and a wall thickness of from 0.6 to 1.2 mm.

35. The method as defined in claim 18, wherein said first time slot is from 0.5 to 2.0 seconds in duration and said second time slot is from 3 to 5 seconds in duration.

\* \* \* \* \*